United States Patent [19]
Hirt et al.

[11] Patent Number: 4,750,058
[45] Date of Patent: Jun. 7, 1988

[54] GAIN CONTROL CIRCUITRY FOR READBACK APPARATUS IN A PRML MAGNETIC RECORDING SYSTEM

[75] Inventors: Walter Hirt, Birmensdorf; Wolfgang Hans Schott, Ruschlikon, both of Switzerland

[73] Assignee: International Business Machines Corporation, Armonk, N.Y.

[21] Appl. No.: 944,904

[22] Filed: Dec. 22, 1986

[30] Foreign Application Priority Data

Aug. 5, 1986 [EP] European Pat. Off. ........ 86110798.5

[51] Int. Cl.$^4$ .......................... G11B 5/09; G11B 5/102
[52] U.S. Cl. .......................................... 360/46; 360/67
[58] Field of Search ....................... 360/46, 67; 369/59

[56] References Cited

U.S. PATENT DOCUMENTS

| | | | |
|---|---|---|---|
| 4,346,411 | 8/1982 | Buhler et al. | 360/46 |
| 4,686,586 | 8/1987 | Dutcher | 360/46 |

FOREIGN PATENT DOCUMENTS 0133480 7/1984 European Pat. Off. .............. 25/497

OTHER PUBLICATIONS

R. W. Wood, "Viterbi Detection of Class IV Partial Response on a Magnetic Recording Channel", IEEE Trans. on Comm., vol. COM-34, No. 5, 1986, pp. 454-461.

F. M. Gardner, "Charge-Pump Phase-Lock Loops", IEEE Trans. on Comm., vol. COM-28, No. 11, 1980, pp. 1849-1858.

*Primary Examiner*—Vincent P. Canney
*Attorney, Agent, or Firm*—F. David LaRiviere

[57] ABSTRACT

In the readback apparatus of magnetic recording system operating in accordance with the partial-response maximum-likelihood (PRML) technique, a variable-gain amplifier (VGA) and a maximum-likelihood sequence detector (ML DET) plus a gain control loop are provided. The detector (19) is designed to operate on input signals (y') having nominal discrete signal amplitudes (a, 0, −a) and it furnishes discrete output signals (ŷ) having such nominal signal amplitudes. The gain control loop is responsive to input (27) and output (29) signals of the detector, and it has charge-pump circuitry (37, 39, 41, 43) for generating a gain control signal ($V_c = V_g$) for the variable gain amplifier (35). To enable proper operation of the system even in case of short-time signal amplitude drops due to media defects, biasing means (49) are provided such that the gain (g) is adjusted to a value which causes the signal amplitudes at the input (27) of the detector to be weighted multiples (ca, 0, −ca) of the nominal amplitude values (a, 0, −a).

19 Claims, 6 Drawing Sheets

FIG. 1
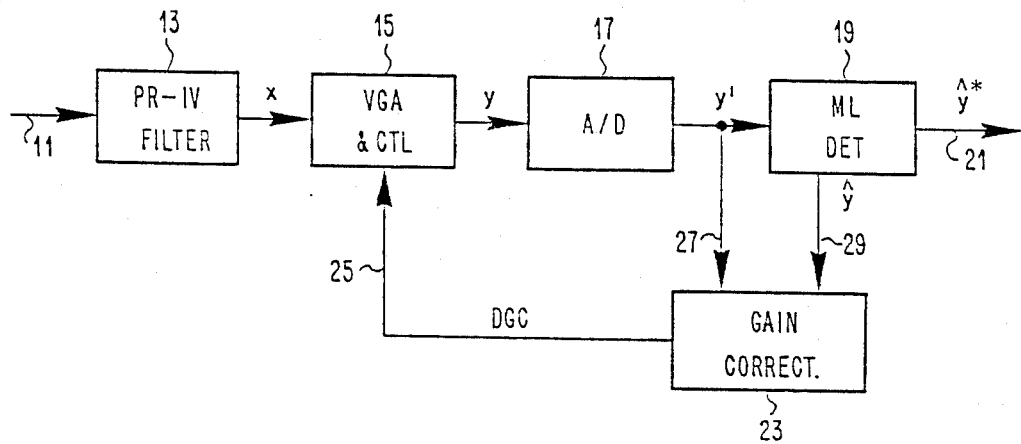
FIG. 2  DISCRETE SIGNAL VALUES AT INPUT OF
MAXIMUM-LIKELIHOOD SEQUENCE DETECTOR
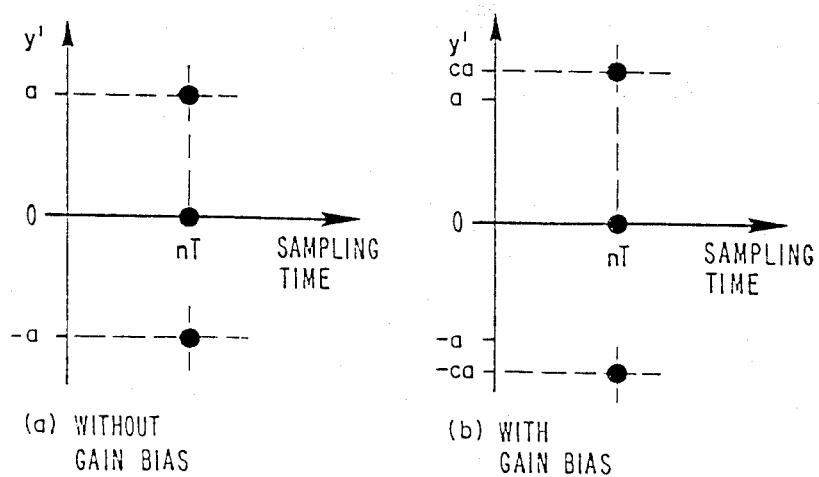
(a) WITHOUT
    GAIN BIAS
(b) WITH
    GAIN BIAS

GAIN CONTROL CIRCUITRY FOR READBACK APPARATUS IN A PRML MAGNETIC RECORDING SYSTEM

FIELD OF THE INVENTION

Present invention is concerned with magnetic recording systems using the partial-response maximum-likelihood principle, and in particular with improvements in the gain control circuitry of the readback apparatus of a magnetic recording system.

BACKGROUND OF THE INVENTION

Recently the partial-response maximum-likelihood principle which was already used in communication systems has found application also in magnetic recording systems. It allows to increase the recording density on the medium, or, on the other hand, to lower the error rate during the readback process for otherwise equal recording channels.

PRML (partial-response maximum-likelihood) magnetic recording applications have been described e.g. in European patent application No. 0,133,480 entitled "Method and Apparatus for Decoding the Output Signal of a Partial-Response Communication or Recording-Device Channel", and in an article by R. W. Wood et al. "Viterbi Detection of Class IV Partial Response on a Magnetic Recording Channel", published in IEEE Transactions on Communications, Vol. COM-34, No. 5, May 1986, pp. 454–461. No details on gain control in the readback apparatus of a PRML magnetic recording system are disclosed in these publications.

An important task of the magnetic readback apparatus is the adaptation of the varying amplitude levels of the readback signal received from the magnetic reading head to the nominal amplitude levels as required by the detector.

In U.S. Pat. No. 4,346,411 entitled "Amplitude-Sensitive Three-Level Detector for Derivative Read Back Channel of Magnetic Storage Device", an apparatus is disclosed for readback of magnetic recording signals which includes a variable-gain amplifier. However, this apparatus is not suited for PRML systems.

The charge-pump principle has been used since several years in phase-locked loop circuitry for converting discrete signals into analog quantities for controlling the oscillators, as is e.g. described in the article "Charge-Pump Phase-Lock Loops" by F. M. Gardner, IEEE Transactions on Communications, Vol. COM-28, No. 11, November 1980, pp. 1849–1858. The charge-pump principle can also be used for deriving the control voltage for a variable gain amplifier from a digital version of the amplified signal in a gain control loop.

One problem in the readback of recorded signals are the short-time signal amplitude drops which are due to small defects in the magnetic recording medium. Such signal amplitude drops which may have a duration of several tens of symbol intervals will result in false detection of data.

These short-duration signal drops cannot be satisfactorily compensated by presently known gain control loops. They represent the limiting factor in the error rate performance and in the stability of the timing and gain control loops of the detection circuitry in the readback system.

OBJECTS OF THE INVENTION

It is a primary object of the invention to improve the readback apparatus of a partial-response maximum-likelihood magnetic recording system so that it can tolerate larger signal drops of short duration.

It is a further object of this invention to improve the variable gain amplifier gain control loop in a PRML magnetic readback apparatus, using the charge-pump principle, with a minimum in hardware changes to enable improved data recovery despite short-time signal drops due to media surface defects.

DISCLOSURE OF THE INVENTION

These objects are achieved by the invention which provides improvements in the readback apparatus of a partial-response magnetic recording system which includes a maximum-likelihood sequence detector designed to respond to input signals having a nominal signal amplitude and which also includes a variable gain amplifier with a gain control loop; in particular the invention provides a bias for this gain control loop so that it furnishes, in response to the input and output signals of the maximum-likelihood sequence detector which it receives, a gain control signal which results in a gain of the variable gain amplifier such that the signal amplitudes at the input of the maximum-likelihood sequence detector are maintained at values which differ from the nominal signal amplitude values by a predetermined weighting factor.

When using the additional bias, either magnetic media of lower quality can be used for a given error rate that can be tolerated, or the error rate performance can be significantly improved for media of the same quality.

Further features and advantages of the invention will become apparent from the following detailed description of its principles and preferred embodiments, which are described with reference to the accompanying drawings.

LIST OF DRAWINGS

FIG. 1 is a block diagram of magnetic readback apparatus using the PRML principle, which is the environment for present invention;

FIG. 2 is a diagram showing the discrete signal amplitude values at the input of the maximum-likelihood sequence detector in the apparatus of FIG. 1;

DETAILED DESCRIPTION

(1) Environment

Figure 3:
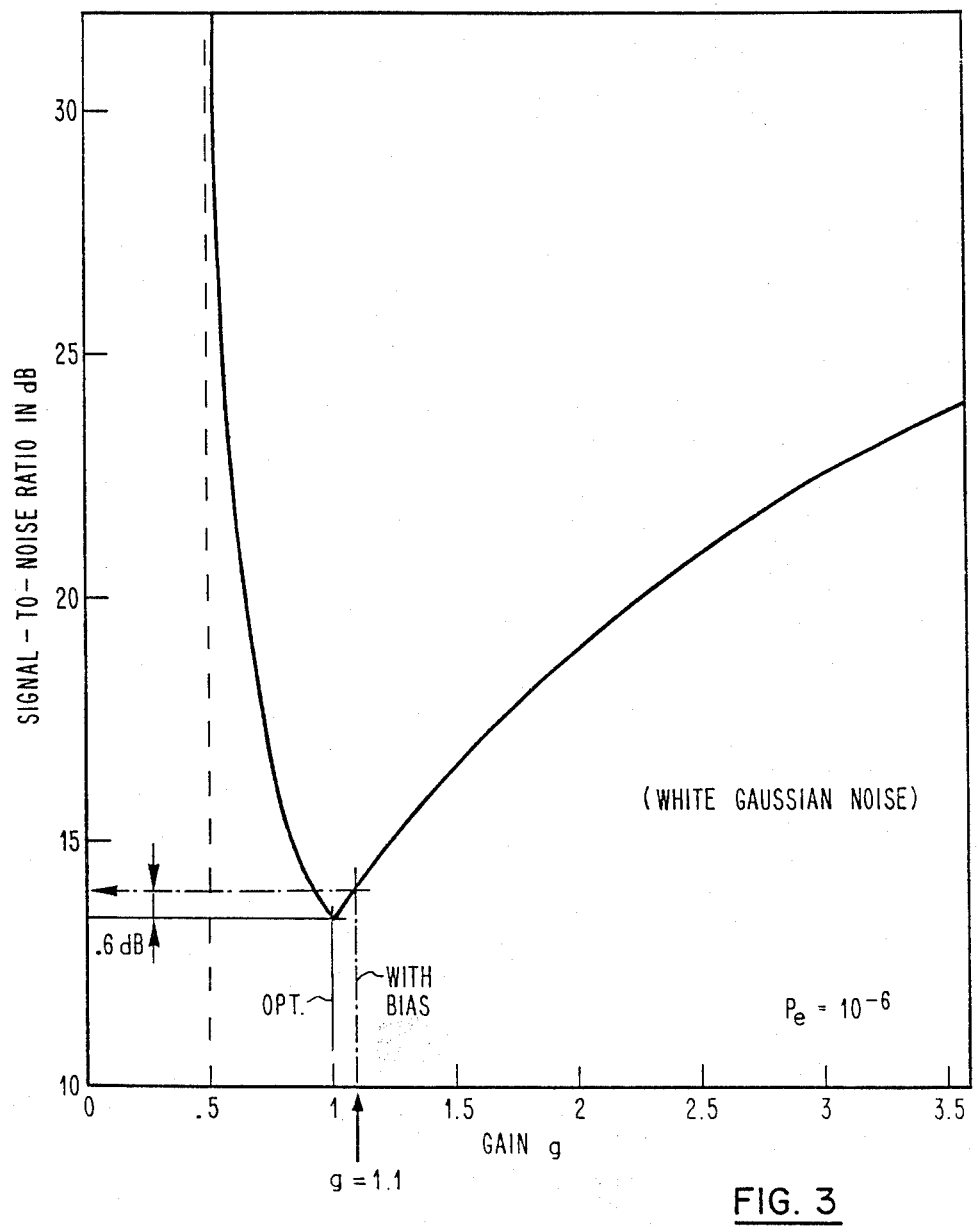
FIG. 3 is a diagram representing the required signal-to-noise ratio for a fixed error rate as a function of different gain values of the variable gain amplifier in the apparatus of FIG. 1.

The portion of a magnetic readback apparatus which is the environment of present invention is shown in a block diagram in FIG. 1.

The partial-response maximum likelihood detection principle (PRML) is used for the readback of data in this system. Background and details of this technique are described in above-cited European patent application and in the article by R. W. Wood et al. and therefore no details need to be given here.

Referring to FIG. 1, the readback signal generated by the magnetic head appears on line 11 and is furnished to a filter 13 which produces a partial-response class IV signal x from the readback signal. The amplitude of the filter output signal x is adapted to the appropriate signal level by variable gain amplifier circuitry 15 (which includes the necessary gain control circuitry as will be described later). The amplitude-normalized readback signal y is then furnished to an analog-to-digital converter 17 which samples the signal and produces a digital representation y'. A maximum-likelihood sequence detector 19 receives the sequence of digital values y' and generates at each sampling instant estimated values ŷ and ŷ* in accordance with the rules of the system. Maximum-likelihood sequence detector 19 produces the estimated values ŷ at an earlier time than the corresponding values y*. The values ŷ* are furnished on an output 21 to a decoder for obtaining as output data a sequence of binary values which should correspond to the recorded sequence of binary values.

Variable gain amplifier (VGA) circuitry 15 is provided to enable a proper operation of the maximum-likelihood sequence detector 19 which is designed for nominal signal amplitude levels of its input signal. Gain correction means 23 is provided for generating a digital gain control signal on lines 25 for adjusting the gain of the variable gain amplifier. Gain correction means 23 receives the digital readback signal values y' and the estimated values ŷ on lines 27 and 29, respectively. In response to the error signal $e = y' - \hat{y}$, the gain correction means, using a given algorithm, determines the required digital gain control signal (DGC) for the variable gain amplifier circuitry, for updating the gain once each sampling interval.

Normally, the gain g of the VGA should be such that the amplitudes of the signal values y=gx and thus y' are at the nominal levels a, 0, and −a (as shown in the left portion (a) of FIG. 2) which are expected by the maximum-likelihood sequence detector. A deviation from this nominal gain will increase the error probability, as will be shown with reference to FIG. 3. In the following, it is assumed that the signal x is such that g=1 represents the nominal gain.

FIG. 3 shows the required signal-to-noise ratio (SNR) of the system as a function of the gain setting for a given error rate $P_e = 10^{-6}$. As can be seen, there is a distinct optimum for g=1.0. A deviation to lower or higher gain values will require a higher SNR if the error rate is to be maintained, or for a given SNR the error rate will increase for any deviation from the optimum g=1.0.

(2) Conventional Variable Gain Amplifier Circuitry

Figure 4:
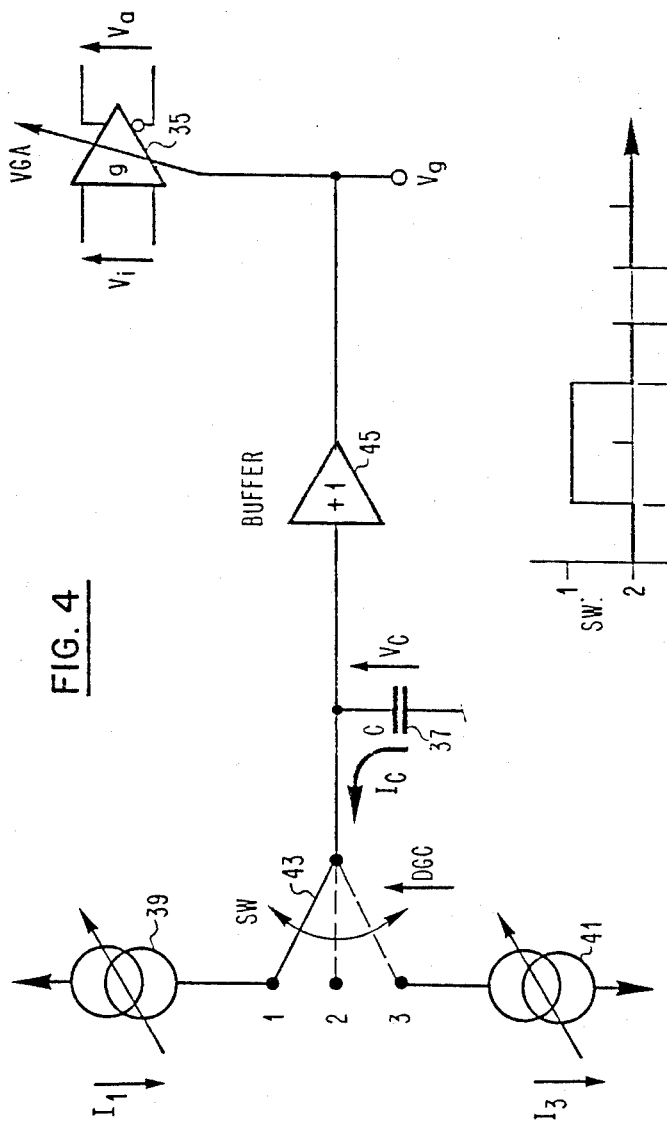
FIG. 4 is a schematic representation of a variable gain amplifier and its control circuitry as shown in FIG. 1 for a magnetic readback apparatus, using the charge-pump principle in a conventional manner.

FIG. 4 shows the basic principle of variable gain amplifier circuitry 15 (including gain control circuitry) in a conventional design. The gain control circuitry uses a charge-pump.

As can be seen in FIG. 4, the actual variable gain amplifier 35 is controlled by gain voltage $V_g$ which determines the ratio between input voltage $V_i$ and output voltage $V_a$. For a given range of voltage $V_g$, the VGA gain is inversely proportional to $V_g$. Voltage $V_g$ in turn is determined by the voltage $V_c$ across a capacitor 37 (C) which can be charged by either one of two current sources 39 ($I_1$) and 41 ($I_3$). A switch 43 (SW) which is controlled by the digital gain control signal DGC selects the charging current $I_c$ for the capacitor: With the switch in position 1, the capacitor is charged and thus the gain is decreased; with the switch in position 3, the capacitor is discharged and the gain is increased; and with the switch in position 2, the charge is maintained and thus the gain is kept at its present level.

Figure 5:
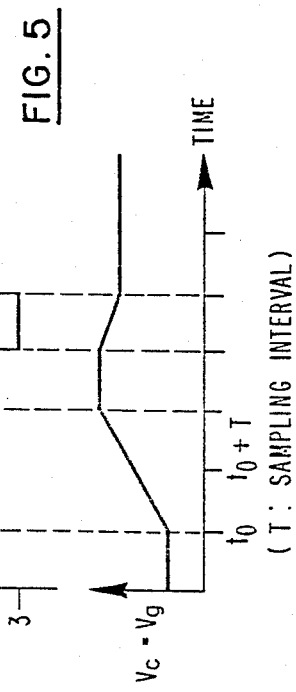
FIG. 5 is a diagram illustrating for the circuitry of FIG. 4 the various switch positions and the resulting variable gain amplifier control voltage.

FIG. 5 shows an example of different switch positions and the resulting capacitor voltage $V_c$. The digital control signal and thus the switch setting are only changed at transitions between timing intervals T. The gain control voltage $V_g$ corresponds to $$V_g = V_c(t_0) - (I_c/C) \cdot t.$$

A unity gain amplifier with high input impedance is provided as buffer 45 between capacitor 37 and the control input of variable gain amplifier 35.

(3) Disadvantages of Conventional Variable Gain Amplifier Circuitry, and Inventive Concept The variable gain amplifier circuitry described so far can properly compensate slow variations in the amplitude level of the input signal x that is furnished by the PR-IV filter 13. If, however, short-duration signal amplitude drops occur in the input signal, this variable gain amplifier circuitry and the gain adjustment algorithm of gain correction means 23 cannot react properly. As a consequence, during these short periods the low signal amplitude level will result in wrong decisions of the maximum-likelihood sequence detector 19. The invention suggests an improvement of the variable gain amplifier control means to allow proper operation of the PRML system even in the case of short-term signal drops in the input signal.

The suggested solution is to give the variable gain amplifier control means a bias which shifts the gain permanently to a somewhat higher value than the optimum. This is indicated in FIG. 3 by the dashed line for the value g=1.1. As can be seen from this diagram, an amplitude drop of about 50% without immediate gain correction would make the PRML system inoperable with the conventional VGA circuitry whereas with a gain bias as shown in FIG. 3, results would still be acceptable. The "misadjustment" due to the bias requires a higher signal-to-noise ratio to maintain a $10^{-6}$ error rate in comparison to the optimum gain without bias, but the difference of 0.6 dB is an acceptable tradeoff in comparison to the significantly improved behavior in the case of short-term signal amplitude drops.

(4) Biased Gain Control Scheme

Figure 6:
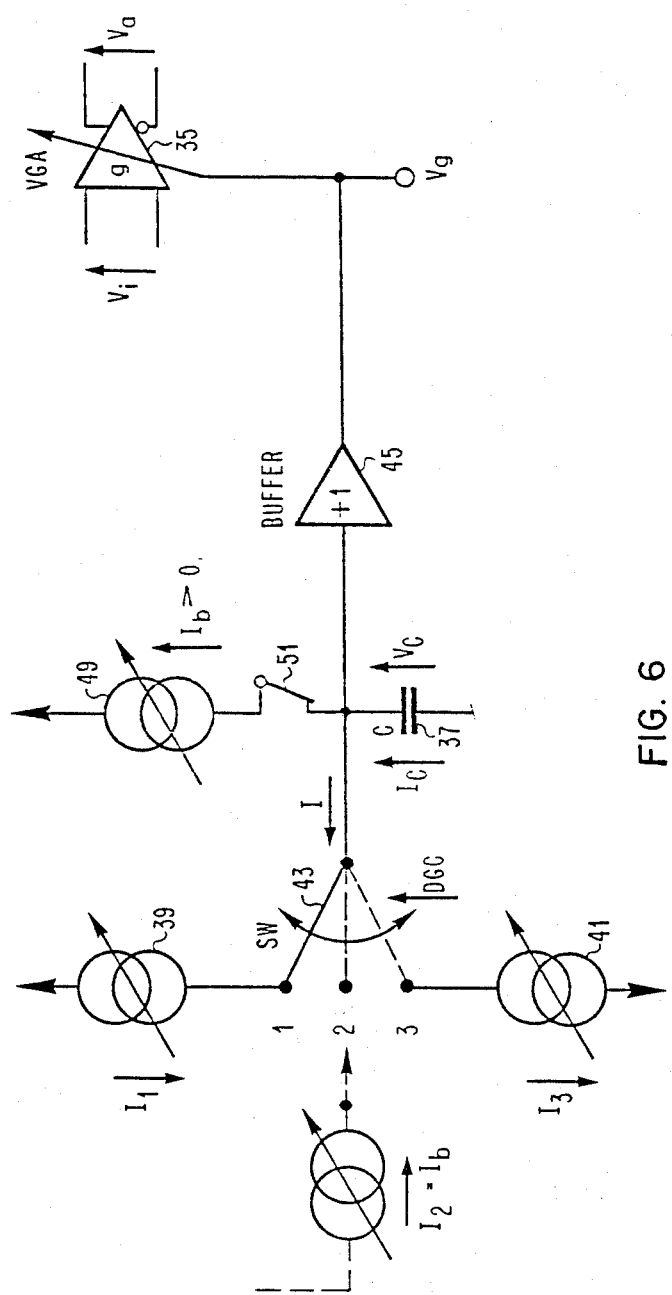
FIG. 6 is a schematic representation of a variable gain amplifier and its control circuitry corresponding to that of FIG. 4 with additional bias current means according to the invention.
Figures 7, 8:
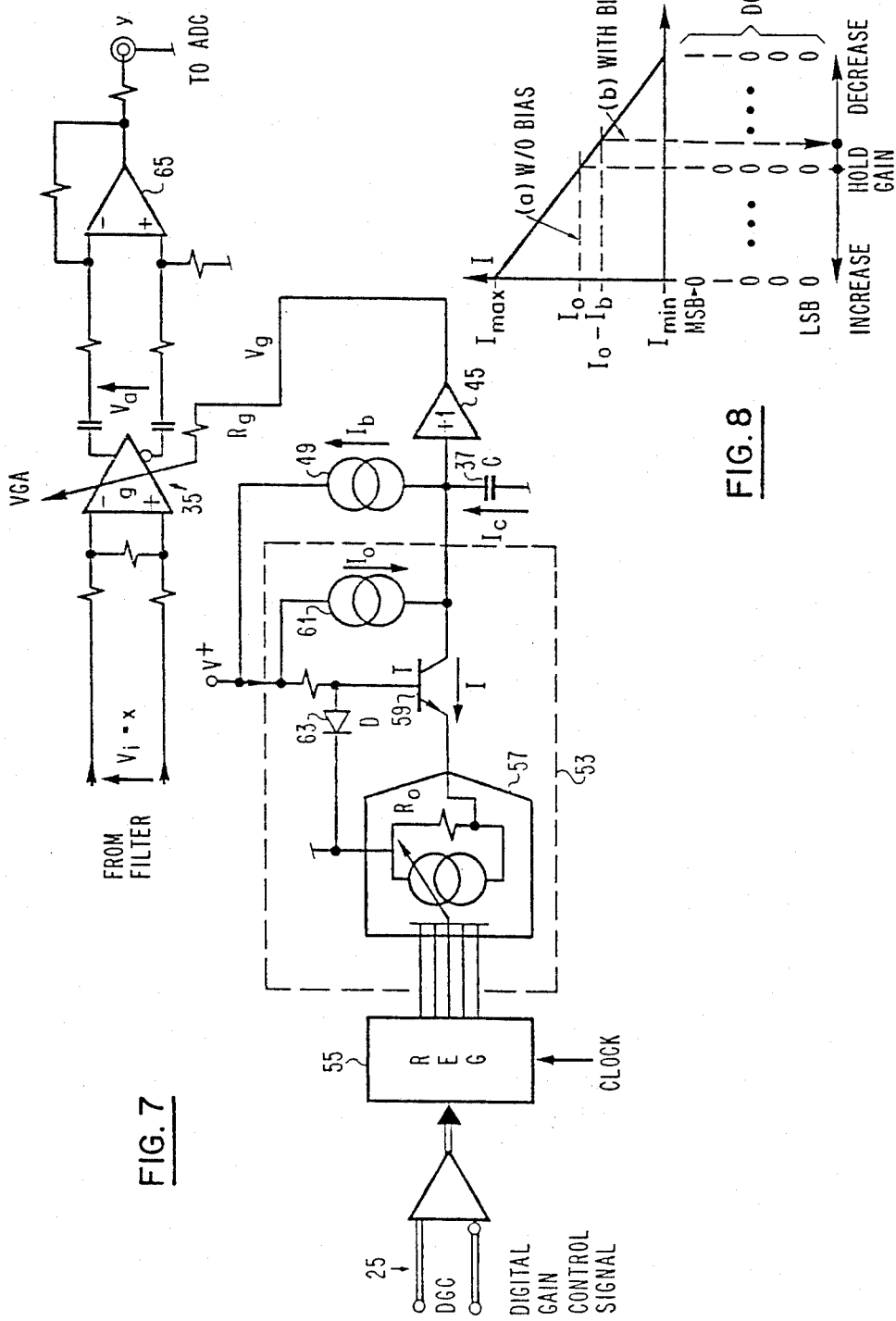
FIG. 7 is a block diagram of an implementation of the variable gain amplifier circuitry shown in FIG. 6.
FIG. 8 is a diagram showing the current furnished by the current source transistor in the charge-pump circuitry of the variable gain setting circuitry in FIG. 7.

FIGS. 6 and 7 show the principle and an implementation, respectively, of variable gain amplifier circuitry with bias according to the invention. The contents of FIG. 6 are equivalent to those of FIG. 4 except that a bias current source 49 is added which continuously discharges capacitor 37 with current $I_b$. In order to compensate this bias current, gain correction means 23 (FIG. 1) must produce a control signal that on the average results in a compensating current $I_2=I_b$, as indicated in dashed lines on the left side of FIG. 6. Such a gain control signal will be obtained if there is a constant error signal representing a "misadjustment" of the gain to a value of e.g. $g=1.1$. In other words: For obtaining a gain which is different from the normal optimal gain by a factor c (e.g. $c=1.1$) and which in a steady state (no variations in the input signal amplitude) results in a given error $e_b$, a bias current $I_b$ must be chosen for the charge pump that just compensates the resulting steady state gain-correction control current $I_2$ so that the gain is maintained at its level (which is the desired bias level of e.g. $g=1.1$).

If a manual or automatic switch 51 is provided in the automatic gain control as shown in FIG. 6, for selectively providing or interrupting the current from bias current source 49, the variable gain amplifier control circuitry can be used for normal conditions without bias, as well as for bad conditions where short-term signal drops are frequently occurring.

With this bias arrangement (and also with that described below with reference to FIG. 7), no changes have to be made to the gain control algorithm, and the only necessary change in the variable gain amplifier control circuitry is the addition of the bias current in the charge pump, but the improvement in performance under bad signal conditions is significant.

The discrete signal amplitudes of the input signal y' of maximum-likelihood sequence detector 19 (FIG. 1) which result from the additional bias for the variable gain amplifier are shown in the right portion (b) of FIG. 2. Instead of the nominal signal amplitudes (a/0/−a) for which the maximum-likelihood sequence detector is designed, it will receive, as a consequence of the bias, other signal amplitudes which are predetermined multiples (ca/0/−ca) of the nominal values.

FIG. 7 is the block diagram of an implementation of the variable gain amplifier circuitry and control whose principle was shown in FIG. 6. Variable gain amplifier 35 and capacitor 37 are also part of this implementation. However, the two current sources 39 and 41 and the switch 43 of FIG. 6 are replaced by basic gain setting circuitry 53 in the implementation of FIG. 7.

The digital gain control signal DGC received on lines 25 (e.g. five bits in parallel) is stored in a register 55 at each sampling time. The five bit values contained in this register are furnished to the gain setting circuitry 53 which mainly comprises a digital-to-analog converter 57, a current source transistor 59 whose current I is determined by the present status of the digital-to-analog converter 57, and a constant current source 61 furnishing current $I_0$. Diode 63 is provided for setting the operating point of transistor 59.

FIG. 8 shows the operational characteristic of current source transistor 59. It provides a unipolar current between a maximum value $I_{max}$ and a minimum value $I_{min}$. When the gain is to be maintained in a conventional configuration without bias, transistor 59 provides a current $I_0$ as shown at (a) in FIG. 8.

Operation of basic gain setting circuitry 53 without bias: The charging current $I_c$ for capacitor C must be either positive or negative as shown in FIG. 6 (and FIG. 4), but current source transistor 59 can only furnish a unipolar current. Therefore, a constant current $I_0$ (from source 61) is superimposed over the current I of transistor 59 to obtain the charging current $I_c$ (when $I_b=0$):

$$I_c=I-I_0.$$

Thus, basic gain setting circuitry 53, in response to the DGC bit combination contained in register 55, furnishes a bipolar charging current $I_c$ of variable magnitude, to either charge or discharge capacitor 37 and thereby increase or decrease the gain control voltage $V_g$ for variable gain amplifier 35.

An operational amplifier 65 receives the output voltage $V_a$ of the variable gain amplifier 35 and furnishes at its output the signal y which is transferred to the input of the analog-to-digital converter 17 (FIG. 1).

For introducing the gain bias according to the invention, an additional current source 49 is provided in the implementation of FIG. 7, which furnishes a bias current $I_b$ to force the gain correction means 23 (FIG. 1) to provide a correction signal DGC such that the VGA gain is maintained at a predetermined higher value than its nominal value.

For the example given in FIG. 7, the current furnished by current source transistor 59 in response to the digital gain control signal DGC when the bias current source is included, is illustrated in the diagram of FIG. 8 at (b). The gain is now maintained at its level with a transistor current $I=I_0-I_b$ which in effect maintains the gain at a value of e.g. $g=1.1$.

(5) Experimental Results and Advantages Gained

Figure 9:
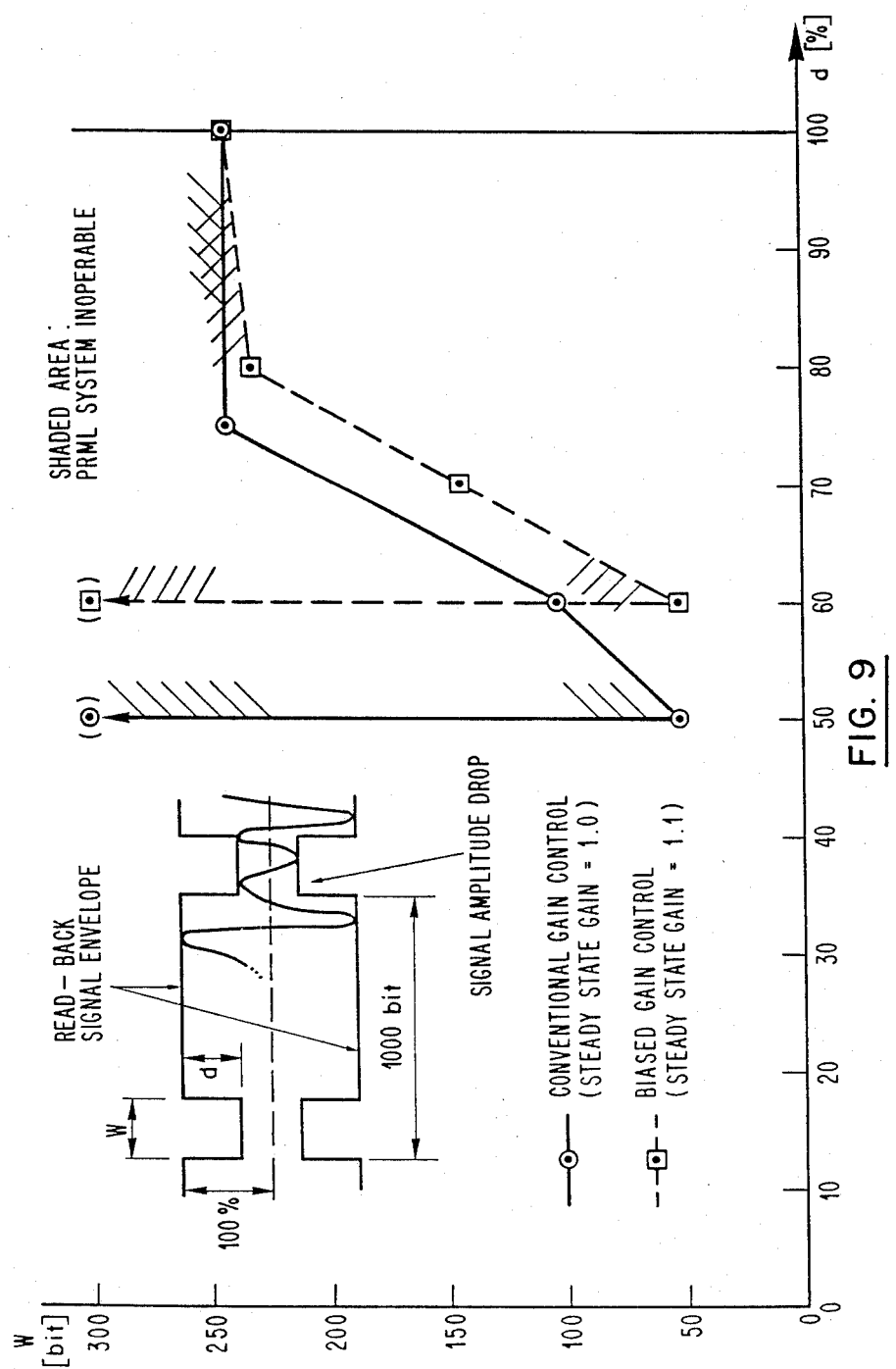
FIG. 9 is a diagram showing the area of operation of the PRML system as a function of the signal drop parameters w and d for the conventional and biased gain control schemes.

Some results of experiments which are shown in FIG. 9 illustrate the effect of the invention. In the upper left of this figure, a readback signal x and its envelope are illustrated with following signal drop parameters: depth d and duration w. The solid and dashed lines on the right side of the drawing indicate the areas where the PRML system is inoperable with the conventional gain control and the biased gain control, respectively. It can be seen that with the bias according to the invention (e.g., $g=1.1$), the acceptable signal drop depth d is increased by 10%.

The advantages gained from the invention can be summarized as follows:

(A) It improves the performance limits of magnetic recording detection schemes, in particular for the PRML technique, in the presence of short duration signal amplitude drops due to media defects, with respect to conventional gain control schemes, in the following way:

(a) the error rate within the signal drop region (w in FIG. 9) is reduced, and (b) the range of operation of the PRML system with respect to the depth of signal drop (d in FIG. 9) is increased.

(B) It decreases the sensitivity of the detection scheme with respect to media surface defects. The requirements for disk surface analysis and for error correction coding (ECC) become less stringent.

(C) Only a simple modification of a conventional gain control scheme is required to obtain the advantages of biased gain control.

(D) In the case of PRML, the timing control loop may also benefit from the biased gain control scheme.

It should be noted that the biased gain control scheme can be applied not only to a partial-response class IV system as described above but also to any other partial-response scheme (as e.g. listed in the paper by P. Kabal et al. "Partial-Response Signaling", published in IEEE Transactions on Communications, Vol. COM-23, No. 9, September 1975, pp. 921-934).

(6) Alternative Embodiments

The embodiment shown in FIG. 7 has a charge pump comprising a unipolar variable current source (59) plus a constant current source (61) for shifting the variable transistor current so that a bipolar charging current $I_c$ results. For the bias, an additional bias current source (49) is provided.

In an alternative embodiment, a bipolar variable current source could be provided so that no constant current source (for shifting a unipolar variable transistor current) would be required. The bias current source (49) would be provided in addition to this bipolar variable current source.

In another alternative, the bias current source (49) could be integrated into the constant current source (61) so that only one fixed current source would be required furnishing a shifting current $I_s = I_0 - I_b$, which would be added to the variable current I of the unipolar current source transistor 59 to obtain the charging current $I_c$.

In a further alternative, the bias current source (49) could be integrated into a unipolar variable current source (59) by changing the operating point of the respective transistor so that in addition to that single, biased unipolar variable current source only one constant current source 61 furnishing a shifting current $I_0$ would be required.

In another alternative embodiment, a single bipolar variable current source with an integrated bias could be provided which furnishes, in response to the digital gain control signal values it receives, the same charging current $I_c$ as the gain setting circuitry 53 in combination with the bias current source 49 as shown in FIG. 7.

In a final alternative, the gain bias can be implemented with an equivalent modification of the gain correction means 23. The digital gain control signal DGC furnished by gain correction means 23 in FIG. 1 would then be derived from the error signal $e = y' - \hat{c}y$ such that the error signal $e = 0$ when the signal amplitudes y' at the input of the maximum-likelihood sequence detector 19 are maintained at the predetermined values (ca, 0, -ca). The variable gain circuitry would then be equivalent to the circuitry shown in FIG. 4 (conventional form) and not as shown in FIG. 6 (i.e. the additional bias current source is then replaced by a respective modification in the determination of the error signal in gain correction means 23 of FIG. 1).

(7) Application Areas

The invention is not only applicable to magnetic storage systems, but also to data storage systems which use the PRML technique and in which signal amplitude drops during readback can occur, e.g. optical data storage systems.

What is claimed is:

1. Readback apparatus for a magnetic recording system using the partial-response maximum-likelihood sequence detection technique, comprising:
    a maximum-likelihood sequence detector designed to respond to input signals having nominal signal amplitudes;
    a variable-gain amplifier; and
    a gain control loop comprising means furnishing a gain control signal for said variable-gain amplifier in response to actual signal amplitudes of the input signal and nominal signal amplitudes of an output signal of said maximum-likelihood sequence detector; and
    biasing means provided for biasing said gain control loop means to furnish a gain control signal which adjusts the gain of said variable-gain amplifier such that the signal amplitudes of the input signal of said maximum-likelihood sequence detector are maintained at increased values which differ from said nominal amplitude values by a predetermined weighting factor.

2. Readback apparatus in accordance with claim 1, characterized in that said gain control loop means includes charge-pump circuitry generating a charging current for a capacitor furnishing said gain control signal, and that said biasing means shifts said charging current by a predetermined amount.

3. Readback apparatus in accordance with claim 2, characterized in that said charge-pump circuitry comprises a unipolar current source for providing a variable current and an additional current source for providing a constant current, said currents being combined for furnishing a variable bipolar charging current.

4. Readback apparatus in accordance with claim 3, characterized in that said biasing means furnishes an additional biasing current which is added to said charging current to shift it by a predetermined amount.

5. Readback apparatus in accordance with claim 3, characterized in that said biasing means is integrated with said additional current source to provide a shifted constant current.

6. Readback apparatus in accordance with claim 2, characterized in that said charge pump circuitry comprises a bipolar current source for providing a variable charging current, and that said biasing means is an additional constant current source for providing a biasing current which is combined with said variable charging current for shifting it by said predetermined amount.

7. Readback apparatus in accordance with claim 1, characterized in that said predetermined weighting factor has a value between 1.05 and 1.20.

8. Readback apparatus in accordance with claim 2, characterized in that said predetermined weighting factor has a value between 1.05 and 1.20.

9. Readback apparatus for a magnetic recording system using the partial-response maximum-likelihood sequence detection (PRML) technique, comprising:
    a maximum-likelihood sequence detector designed to respond to input signals having nominal signal amplitudes;
    variable-gain amplifier circuitry including a variable-gain amplifier; and
    gain correction means responsive to actual signal amplitudes of the input signal and nominal signal amplitudes of the output signal of the maximum-likelihood sequence detector, and generating a first control signal for said variable-gain amplifier circuitry;
    said variable-gain amplifier circuitry further including control means for generating a second control signal for adjusting the gain of said variable-gain amplifier, including charge-pump circuitry furnishing in response to said first control signal a charging current of selectable magnitude to normally adjust said gain so that the signal amplitudes of the input signal of the maximum-likelihood sequence detector assume said nominal signal amplitude values; and
    additional means being provided in said control means for biasing by a predetermined amount said charging current at each selected magnitude to thus maintain the signal amplitudes of the input signal of the maximum-likelihood sequence detector at increased values which differ from said nominal values by a predetermined weighting factor.

10. Readback apparatus in accordance with claim 9, characterized in that said weighting factor is between 1.05 and 1.20.

11. Readback apparatus for a magnetic recording system using the partial-response maximum-likelihood sequence detection technique, comprising:
 a maximum-likelihood sequence detector designed to respond to input signals having nominal signal amplitudes;
 variable-gain amplifier circuitry including a variable-gain amplifier; and
 gain correction means generating a first control signal for said variable-gain amplifier circuitry in response to an error signal given by the relation $e = y' - \hat{y}$, where $y'$ is the actual signal amplitude of the input signal, and $\hat{y}$ is the nominal signal amplitude of the output signal of the maximum-likelihood sequence detector;
 said variable-gain amplifier circuitry comprising control means for generating in response to said first control signal, a second control signal for said variable-gain amplifier to normally adjust its gain so that the signal amplitudes of the input signal of the maximum-likelihood sequence detector assume said nominal signal amplitude values;
 said gain correction means being adapted to bias the output signal of said maximum-likelihood sequence detector by a predetermined weighting factor such that the first control signal generated causes the input signal amplitudes of said maximum-likelihood sequence detector to be maintained at increased values which differ from said nominal values by the predetermined weighting factor.

12. Readback apparatus for a recording system using the partial-response maximum-likelihood sequence detection technique, comprising:
 a maximum-likelihood sequence detector designed to respond to input signals having nominal signal amplitudes;
 a variable-gain amplifier; and
 a gain control loop comprising means furnishing a gain control signal for said variable-gain amplifier in response to actual signal amplitudes of the input signal and nominal signal amplitudes of an output signal of said maximum-likelihood sequence detector; and
 biasing means provided for biasing said gain control loop means to furnish a gain control signal which adjusts the gain of said variable-gain amplifier such that the signal amplitudes of the input signal of said maximum-likelihood sequence detector are maintained at increased values which differ from said nominal amplitude values by a predetermined weighting factor.

13. Readback apparatus in accordance with claim 12, characterized in that said gain control loop means includes charge-pump circuitry generating a charging current for a capacitor furnishing said gain control signal, and that said biasing means shifts said charging current by a predetermined amount.

14. Readback apparatus in accordance with claim 13, characterized in that said charge-pump circuitry comprises a unipolar current source for providing a variable current and an additional current source for providing a constant current, said currents being combined for furnishing a variable bipolar charging current.

15. Readback apparatus in accordance with claim 14, characterized in that said biasing means furnishes an additional biasing current which is added to said charging current to shift it by a predetermined amount.

16. Readback apparatus in accordance with claim 14, characterized in that said biasing means is integrated with said additional current source to provide a shifted constant current.

17. Readback apparatus in accordance with claim 13, characterized in that said charge pump circuitry comprises a bipolar current source for providing a variable charging current, and that said biasing means is an additional constant current source for providing a biasing current which is combined with said variable charging current for shifting it by said predetermined amount.

18. Readback apparatus in accordance with claim 12, characterized in that said predetermined weighting factor has a value between 1.05 and 1.20.

19. Readback apparatus in accordance with claim 13, characterized in that said predetermined weighting factor has a value between 1.05 and 1.20.

* * * * *